(12) United States Patent
Morris et al.

(10) Patent No.: US 7,021,940 B2
(45) Date of Patent: Apr. 4, 2006

(54) PATIENT SIMULATOR MANIKIN AND SYSTEM

(75) Inventors: Richard Walter Morris, St Leonards (AU); James Craig Herbert, Cronulla (AU)

(73) Assignee: Northern Sydney Area Health Service, St. Leonards (AU)

( * ) Notice: Subject to any disclaimer, the term of this patent is extended or adjusted under 35 U.S.C. 154(b) by 501 days.

(21) Appl. No.: 10/303,666

(22) Filed: Nov. 21, 2002

(65) Prior Publication Data

US 2004/0101814 A1    May 27, 2004

(51) Int. Cl.
G09B 23/28    (2006.01)
(52) U.S. Cl. ............... 434/268; 434/267; 434/272
(58) Field of Classification Search ........... 434/126, 434/262, 267, 268, 272
See application file for complete search history.

(56) References Cited

U.S. PATENT DOCUMENTS

| | | | |
|---|---|---|---|
| 3,376,660 A * | 4/1968 | McGinnis | 434/268 |
| 3,520,071 A | 7/1970 | Abrahamson et al. | |
| 3,710,454 A * | 1/1973 | Mellor | 434/268 |
| 4,166,377 A | 9/1979 | Szabo et al. | |
| 4,360,345 A | 11/1982 | Hon | |
| 4,588,383 A | 5/1986 | Parker et al. | |
| 4,601,665 A | 7/1986 | Messmore | |
| 4,611,998 A | 9/1986 | Ramamurthy | |
| 4,773,865 A * | 9/1988 | Baldwin | 434/268 |
| 4,797,104 A | 1/1989 | Laerdal et al. | |
| 4,932,879 A | 6/1990 | Ingenito et al. | |
| 5,021,878 A | 6/1991 | Lang | |
| 5,061,188 A | 10/1991 | McCollum | |
| 5,083,962 A | 1/1992 | Pracas | |
| 5,215,469 A * | 6/1993 | Kohnke et al. | 434/268 |
| 5,385,474 A | 1/1995 | Brindle | |
| 5,509,810 A | 4/1996 | Schertz et al. | |
| 5,593,306 A | 1/1997 | Kohnke | |
| 5,609,485 A | 3/1997 | Bergman et al. | |
| 5,634,797 A * | 6/1997 | Montgomery | 434/268 |
| 5,823,787 A * | 10/1998 | Gonzalez et al. | 434/265 |
| 5,900,923 A | 5/1999 | Prendergast et al. | |
| 5,951,301 A * | 9/1999 | Younker | 434/272 |
| 6,007,432 A | 12/1999 | Kosmatka | |
| 6,042,450 A | 3/2000 | Leversedge et al. | |
| 6,062,866 A * | 5/2000 | Prom | 434/268 |
| 6,193,519 B1 | 2/2001 | Eggert et al. | |
| 6,227,864 B1 | 5/2001 | Egelandsdal et al. | |
| 6,234,804 B1 * | 5/2001 | Yong | 434/267 |
| 6,273,728 B1 | 8/2001 | van Meurs et al. | |
| 6,336,812 B1 * | 1/2002 | Cooper et al. | 434/267 |

(Continued)

Primary Examiner—Kurt Fernstrom
(74) Attorney, Agent, or Firm—Knobbe, Martens, Olson & Bear LLP (57) ABSTRACT

A system (100) for simulating a fluid flow condition within a fluid carrying body cavity includes an elastically deformable bladder (101) simulating the body cavity and mounted to the body of a patient simulator manikin (3). An inlet tube (102) communicates a pressurised fluid supply (1) with the bladder (101). A solenoid valve (103) enables/disables flow of fluid through the inlet tube (102). The solenoid valve (103) is controlled by a control means (2) based on the simulated fluid flow condition. An inlet flow restrictor (106) restricts flow of fluid through the inlet tube (102). An outlet flow restrictor (105) is associated with an outlet (104) for restricting flow of fluid through the outlet to atmosphere. A simulator is also disclosed comprising a manikin (3) and various fluid flow simulation systems associated with the manikin (3) for simulating a lung respiratory rate, blood pulse rate and blood pressure.

30 Claims, 4 Drawing Sheets

U.S. PATENT DOCUMENTS

| | | |
|---|---|---|
| 6,428,321 B1 | 8/2002 | Jurmain et al. |
| 6,517,354 B1 * | 2/2003 | Levy .......................... 434/262 |
| 6,790,043 B1 * | 9/2004 | Aboud ....................... 434/268 |
| 6,874,501 B1 * | 4/2005 | Estetter et al. ......... 128/205.15 |

* cited by examiner

PATIENT SIMULATOR MANIKIN AND SYSTEM

FIELD OF THE INVENTION

The present invention relates to medical training simulators, and in particular relates to a patient simulator manikin and system for simulating a fluid flow condition within a fluid carrying body cavity.

BACKGROUND OF THE INVENTION

Patient simulator manikins have proven a useful element in health care training, especially for emergency procedures such as resuscitation.

Various different forms of patient simulator manikins have been developed to assist in such emergency training. The available simulators range from relatively simple and inexpensive manikins useful for basic "part task" training, such as that disclosed in U.S. Pat. No. 6,227,864 assigned to Asmund S, Laerdal A/S. The simulator disclosed provides a simulation of the torso, head, trachea and lungs for practicing cardiopulmonary resuscitation. The manikin disclosed is static, and somewhat unrealistic. Other available is patient simulator manikins utilise complex computer controlled systems to provide more realistic environments, as disclosed for example in U.S. Pat. No. 6,273,728 assigned to the University of Florida. Such complex manikins, whilst being realistic, are typically extremely complex and prohibitively expensive.

OBJECT OF THE INVENTION

It is an object of the present invention to overcome or substantially ameliorate at least one of the above disadvantages.

SUMMARY OF THE INVENTION

In one aspect the present invention provides a system for simulating a fluid flow condition within a fluid carrying body cavity comprising:

an elastically deformable bladder simulating said body cavity and mounted to the body of a patient simulator manikin, a pressurised fluid supply, an inlet tube communicating said pressurized fluid supply with said bladder, a valve for enabling/disabling flow of fluid through said inlet tube from said pressurised fluid supply to said bladder, a controller for controlling said valve based on said simulated fluid flow condition, an outlet for venting fluid from said bladder, an inlet flow restrictor for restricting flow of said fluid through said inlet tube and an outlet flow restrictor associated with said outlet for restricting flow of said fluid through said outlet.

Typically, said valve consists of a solenoid valve.

Typically, said controller comprises:

an operator input terminal for inputting said simulated flow condition, and a processor for converting said input simulated flow condition into a control signal to open/close said valve.

In one form, said bladder simulates a lung and is mounted within a chest cavity of said manikin.

Typically, where said bladder simulates a lung, said input simulated flow condition is a respiratory rate and said control signal periodically opens and closes said valve means at a cyclic rate corresponding to said input respiratory rate.

Preferably, said control signal provides a substantially constant ratio of valve opening time to valve closing time irrespective of said respiratory rate.

Preferably, said substantially constant ratio is approximately 1:5.

Said system may include two including two said lung simulating bladders mounted side by side within said chest cavity, each said bladder having a said inlet tube valve outlet and outlet flow restrictor associated therewith.

In a preferred form, said system further simulates a pneumothorax condition, said controller further having a pneumothorax input, said controller closing the valve associated with one of said bladders on activation of said pneumothorax input whilst retaining cyclic opening and closing of the valve associated with the other of said bladders.

In another form, said bladder simulates a blood vessel and is mounted adjacent the outer surface of said manikin.

Said blood vessel simulating bladder is typically in the form of a distensible tube sealed at a distal end thereof.

Said blood vessel simulating bladder may simulate a brachial, umbilical or carotid blood vessel.

Typically, where said bladder simulates a blood vessel, said input flow condition is a pulse rate and said control signal periodically opens and closes said valve at a cyclic rate corresponding to said input pulse rate.

Preferably, said control signal provides a constant valve opening time for each cycle irrespective of said pulse rate, said valve closing time varying as said pulse rate is varied.

Preferably, said constant valve opening time is approximately 0.15 seconds.

Additionally, where said bladder simulates a pulse rate in a brachial blood vessel, said system further simulates blood pressure, said operator input terminal further having a blood pressure input, said system further comprising a blood pressure sensing apparatus in the form of an inflatable cuff positionable over the limb containing said brachial blood vessel simulating bladder and a pressure sensor for measuring pressure within said cuff, said controller further comprising a comparator for comparing said cuff pressure with said input blood pressure, said controller generating a signal to close said valve when said cuff pressure exceeds said input blood pressure and to open and close said valve at said cyclic rate when said cuff pressure is less than said input blood pressure.

Said system may include one or two said lung simulating bladders and one or more said blood vessel simulating bladders, each said bladder having a said inlet tube valve outlet and outlet flow restrictor associated therewith.

In another aspect the present invention provides a patient simulator comprising:

a manikin body or body portion, a system as defined above having at least one said bladder mounted to said body or body portion.

In one form, where at least one said lung simulating bladder is mounted within said chest cavity of said manikin body, said simulator further comprises an auxiliary lung simulating bladder mounted within said chest cavity either overlying or underlying said at least one lung simulating bladder, said auxiliary lung simulating bladder communicating with at least one of a mouth and nose of said manikin for simulation of externally assisted respiration.

BRIEF DESCRIPTION OF THE DRAWINGS

A preferred form of the present invention will now be described by way of example with reference to the accompanying drawings, wherein.

DETAILED DESCRIPTION OF THE PREFERRED EMBODIMENTS

Figure 1:
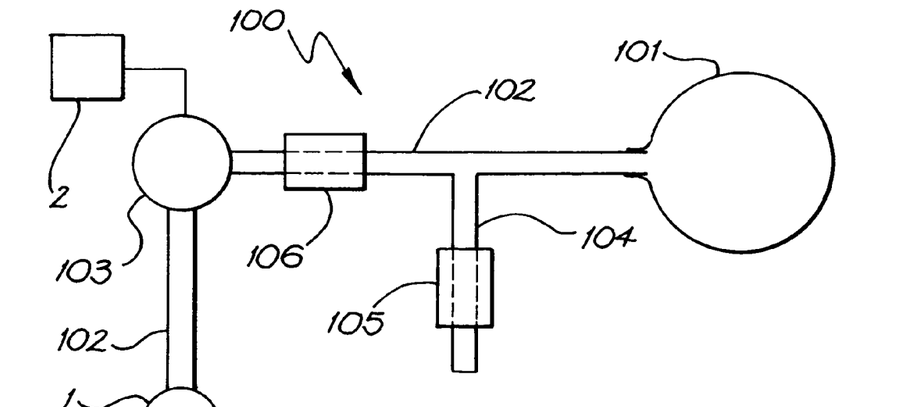
FIG. 1 is a schematic diagram of a system for simulating a fluid flow condition within a fluid carrying body cavity.

Referring to FIG. 1, a generic system 100 for simulating any of various fluid flow conditions within any of various fluid carrying body cavities is depicted. The system 100 includes an elastically deformable bladder 101 simulating the relevant body cavity communicating with a pressurised fluid supply 1 by way of inlet tubing 102. A valve means, typically in the form of a solenoid valve 103, is positioned in line with the inlet tubing 102 for enabling/disabling flow of fluid through the inlet tubing 102 from the fluid supply 1 to the bladder 101. Operation of the solenoid valve 103 is controlled by a control means 2 based on the fluid flow condition to be simulated. Outlet tubing 104 vents fluid from the bladder 101 to atmosphere. An outlet flow restrictor 105 is placed in line with the outlet tubing 104 so as to restrict venting of fluid to atmosphere. An inlet flow restrictor 106 is placed in line with the inlet tubing 102 downstream of the solenoid valve 103 to restrict flow of fluid through the inlet tubing 102. The flow restrictors 105, 106 will typically be commonly available in line orifice restrictors commonly used in pneumatic control circuits and each consist of a restrictor body with a restricted flow orifice and inlet and outlet ports configured for mating with flexible tubing.

The inlet flow restrictor 106 limits the flow from the fluid supply 1 so as to control the rate at which the bladder 101 expands on opening of the solenoid valve 103. The rate of flow through the inlet and outlet flow restrictors 106, 105 is dependent upon the pressure drop across the relevant flow restrictor and the diameter of the restricted orifice of the flow restrictor. Appropriate selection of flow restrictors to provide the desired inlet and outlet flow rates can be made through trial and error.

When the control means 2 provides a signal to open the solenoid valve 103, fluid flows from the gas source 1 through the inlet tubing 102, solenoid valve 103 and inlet flow restrictor 106 and into the bladder 101, expanding the same. As the pressure in the bladder increases, so will the pressure drop across the outlet flow restrictor 105, and fluid will gradually start to vent to atmosphere through the outlet tubing 104 and outlet flow restrictor 105. Similarly, as the pressure in the bladder increases, the pressure drop across the inlet flow restrictor 106 will decrease, thereby gradually decreasing the flow rate into the bladder 101. A relatively smooth and gradual inflation and deflation of the bladder 101 can thus be achieved. The characteristics of the inflation and deflation can be tailored through selection of the inlet and outlet flow restrictors.

As the volume of fluid flowing into the bladder 101 increases, the bladder 101 will elastically expand as a result of the rising pressure caused by the fluid inflow. Once the control means 2 signals for the solenoid valve 103 to be closed, the in flow of fluid from the fluid source 1 ceases. The increased pressure within the bladder 101 as compared to atmosphere, maintained by the elastic deformation of the bladder 101, results in the fluid within the expanded bladder 101 gradually being exhausted through the outlet flow restrictor 105, venting to atmosphere.

Accordingly, by control of a single solenoid valve 103, the bladder 101 can be made to expand and contract through intake and exhaust phases in a regulated manner.

The system described above can be used to simulate fluid flow conditions within various fluid carrying body cavities, including in particular respiratory air flow within a pair of lungs or blood flow within a blood vessel. The system may also be utilised to simulate other conditions such as fluid pressure acting on the skull of a patient. A series of systems as described can be utilised to simulate various conditions within various fluid carrying body cavities of a single manikin.

Due to the simple and compact nature of the above described system, it can be readily incorporated into a neo-natal simulator manikin, such as the Laerdal ALS Baby Manikin. This manikin is a relatively simple static manikin having a basic static cardiopulmonary resuscitation simulating function of the type described in U.S. Pat. No. 6,227,864 discussed above. The baby manikin has been modified with the fitting of several fluid flow simulating systems as described above to enable training of the widely used A-B-C (airway-breathing-circulation) resuscitation process.

Figure 2:
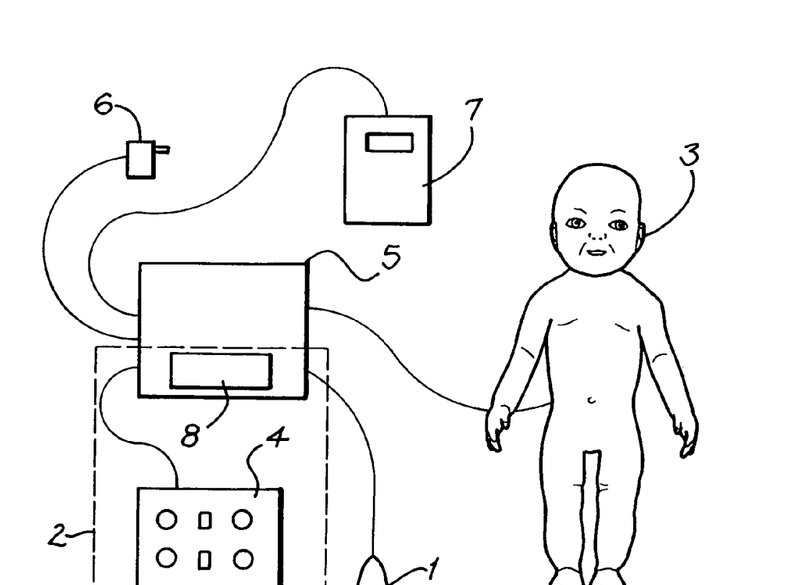
FIG. 2 is a schematic view of a patient simulator.
Figure 3:
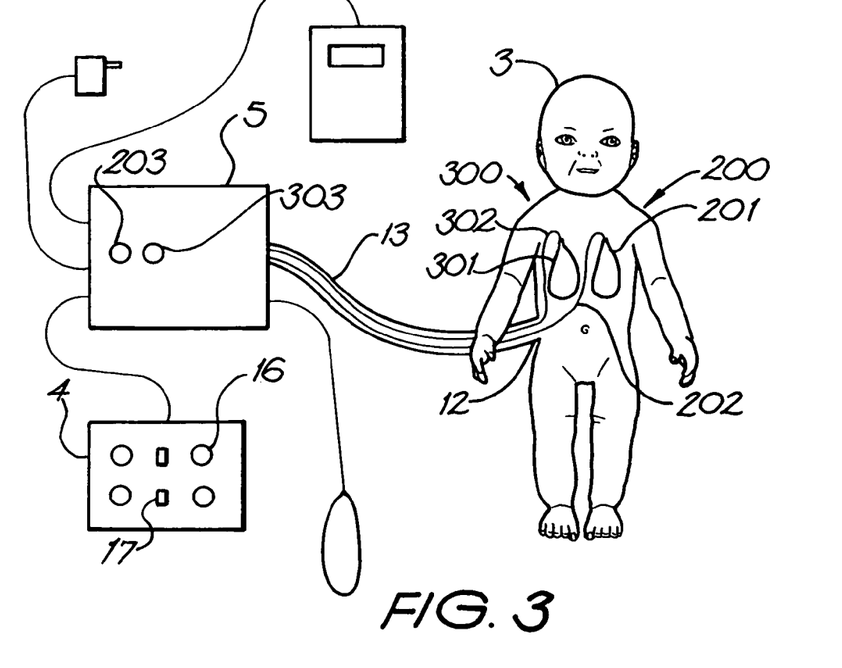
FIG. 3 is a schematic view of the simulator of FIG. 2 depicting the lung simulation systems.
Figure 4:
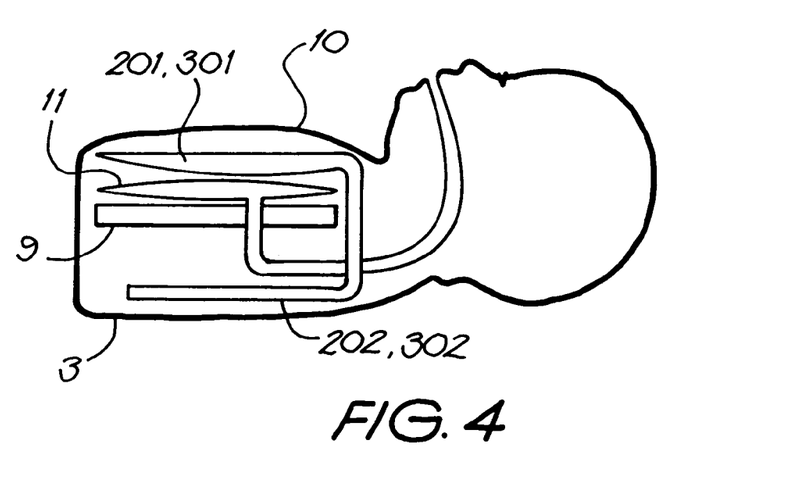
FIG. 4 is a cross sectional view of the manikin of the simulator of FIG. 2 showing arrangement of lung simulation bladders.

A patient simulator incorporating several of the systems described above with a Laerdal ALS Baby manikin is schematically depicted in FIG. 2 The simulator comprises the manikin 3, a regulated air or oxygen source 1, an operator input terminal 4, an interface box 5, a power supply 6 and a simulated pulse oximeter 7. The interface box 5 incorporates processor means 8 which together with the operator input terminal 4 form the control means for each of the fluid simulation systems.

Referring specifically to FIGS. 3 to 6, a first fluid flow simulation system 200 includes an elastically deformable bladder 201, here formed from a standard rubber balloon, simulating a left lung. The left lung bladder 201 is mounted within the chest cavity of the manikin 3 in between a rigid chest plate 9 and the flexible outer chest layer 10 defining the exterior surface of the chest of the manikin 3, as depicted in the cross sectional view of FIG. 4. The left lung bladder 201 is positioned in the chest cavity defined between the chest plate and outer chest layer 10 overlying an auxiliary lung simulating bladder 11 provided with the Laerdal ALS Baby manikin and which communicates with the mouth of the manikin for simulation of externally assisted respiration. The left lung bladder 201 communicates with a first solenoid valve 203 mounted in the interface box 5 by way of a first inlet tube 202, as shown in detail in FIG. 5. The first inlet tube 202 passes through an aperture 12 in the side of the manikin and through a coupling duct 13 to the interface box 5 and the first solenoid valve 203. The first inlet tube is formed of flexible 4 mm internal diameter plastic tubing. The outlet tubing 204 communicates the left lung bladder 201 (via a portion of the inlet tubing 202) to a muffler box 14 located within the interface box 5 which in turn vents to atmosphere by way of a vent tube 15. The muffler box acts to muffle the sound of the air venting.

Figure 5:
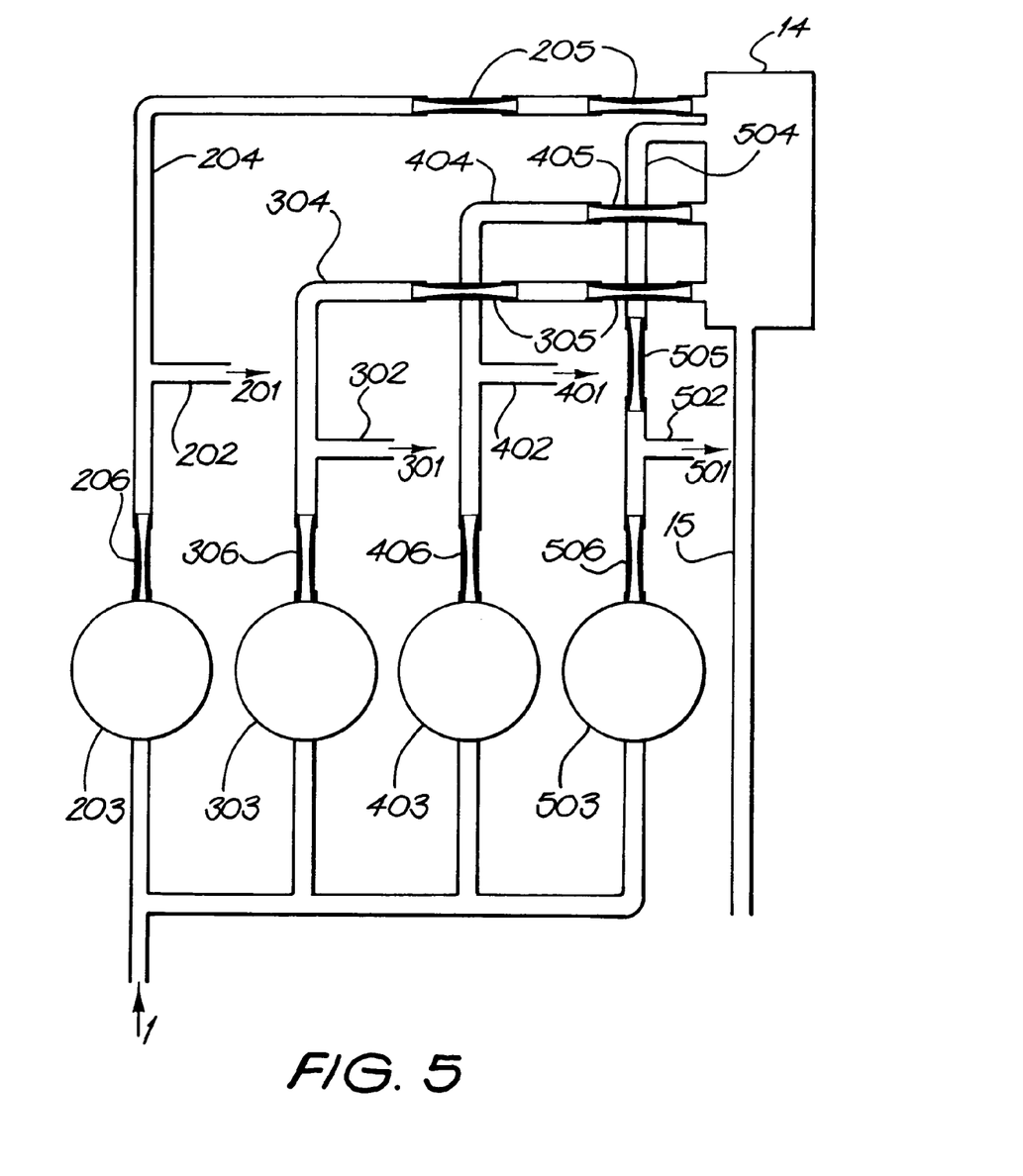
FIG. 5 is a schematic diagram of the pneumatic controls of the simulator of FIG. 2.

A first inlet flow restrictor 206 is positioned in line with the first inlet tube 202 downstream of the first solenoid valve 203 to restrict flow from the fluid source 1 to the left lung bladder 201. The first inlet flow restrictor 206 has a restricted orifice diameter of 0.012 inches (0.305 mm). Two outlet flow restrictors 205 are positioned in line with the first outlet tube 204 upstream of the vent box 14 to restrict fluid flow through the outlet tube 204 to the muffler box 14. The two outlet flow restrictors 205 each have a restricted orifice diameter of 0.025 inches (0.635 mm). Typically a single outlet flow restrictor will be utilised, however the present inventors have achieved the desired result with the use of two restrictors in line. The person skilled in the art will be able to readily determine an appropriate inlet and outlet flow restrictor configuration for any given application through simple trials.

A second fluid flow simulating system 300 includes an elastically deformable bladder 301 simulating a right lung in the same manner as the left lung bladder 201. The right lung bladder 301 is again a simple rubber balloon and is positioned within the chest cavity 11 of the manikin 3 overlying the auxiliary lung simulating bladder 11 of the manikin 3. A second inlet tube 302 communicates the right lung bladder 301 with a second solenoid valve 303 in the interface box 5. In the same manner as for the first left lung simulating system, a second inlet flow restrictor 306 is positioned in line directly down stream of the second solenoid valve and an outlet tube 304 communicates the right lung bladder 301 with the muffler box 14. Two second outlet flow restrictors 305 are positioned in line with the second outlet tube 304 in the same manner as for the first left lung system.

Figure 6:
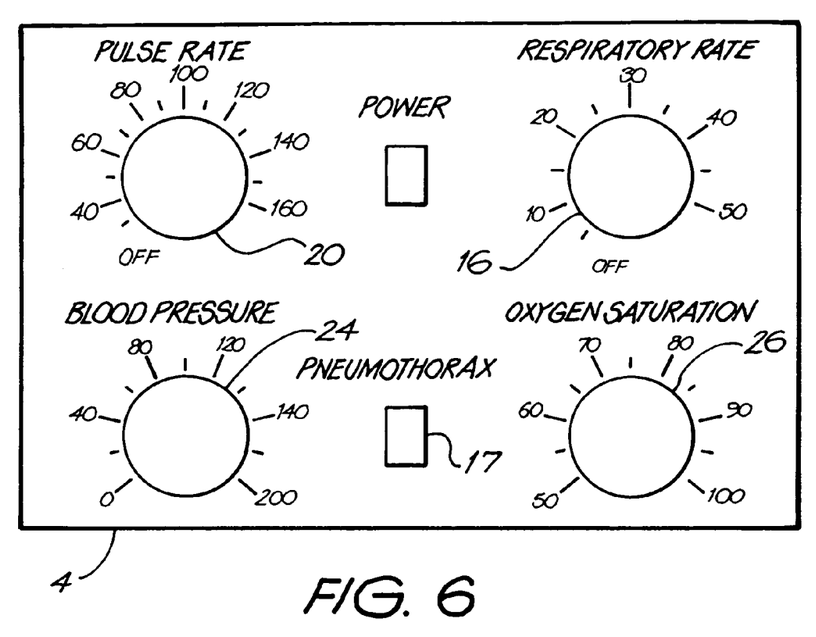
FIG. 6 is a schematic view of the operator input terminal of the simulator of FIG. 2.

Inflation and deflation of the left and right lung bladders 201, 301 simulates a respiratory rate that is input via an analogue respiratory rate input dial 16 of the operator input terminal 5 depicted in greater detail in FIG. 6. The input respiratory rate is converted by the processor 8 mounted within the interface box 5 into a control signal which periodically opens and closes both the first and second solenoid valves 203, 303 at a cyclic rate corresponding to the input respiratory rate. Accordingly, the left and right lung bladders 201, 301 inflate and deflate through a simulated respiratory cycle at the input respiratory rate. The outer chest layer 10 of the manikin accordingly raises and lowers so as to have the appearance of the manikin breathing at the respiratory rate. Inflation of the lung bladders can also be heard with a stethoscope placed on the chest.

The present inventors have found the artificial respiration of the manikin is most realistic when the ratio of the valve opening time, governing inflation of the lung bladders 201, 301, to the solenoid valve closing time, governing the deflation of the lung bladders, is constant. In particular, a realistic result is obtained when the ratio of the solenoid valve 203, 303 opening time to the closing time is approximately 1:5.

The two lung simulation systems further simulate a pneumothorax condition, controlled by way of a pneumothorax input switch 17 located on the operator input terminal 4. When the operator activates the pneumothorax switch 17, the processor 8 closes the first solenoid valve 203 so as to stop respiration of the first lung bladder 201, whilst maintaining the cyclic opening and closing of the second solenoid valve 303, so as to continue respiration of the right lung bladder 301. Accordingly, a pneumothorax condition is simulated where only one lung functions as a result of a puncture or other defect in the opposing lung. Cyclic operation of the pneumothorax switch 17 can be used to change which lung bladder is rendered inactive. For a simulator where a pneumothorax simulation is not required, a single solenoid valve could be utilised to control both lung bladders. Further, a single lung bladder extending across the chest cavity could be utilised for simplicity if so desired.

Through operator control of the respiratory rate via the respiratory rate input dial 16 and application of a pneumothorax condition by way of the pneumothorax switch 17, the operator can readily control the respiratory rate of the manikin 3 and the occurrence of a pneumothorax condition. A realistic trading aid is thus provided to a trainee assessing the breathing of the manikin and deciding on an appropriate course of remedial action. The operator can her manipulate the input dependent upon the course of action taken by the trainee. If the course of action taken by the trainee includes the application of mouth to mouth resuscitation, the standard airway clearance and manual respiration functions of the Laerdal manikin can be utilised, activating We auxiliary lung simulating bladder 11, positioned beneath the lung bladders 201, 301. On application of positive pressure to the manikin airway, the auxiliary lung bladder 11 will inflate. Manual inflation/deflation of the auxiliary lung simulating bladder 11 will either act with or against inflation of the lung simulating bladders 201, 301 dependent upon the timing of the airway pressure applied by the trainee.

Figure 7:
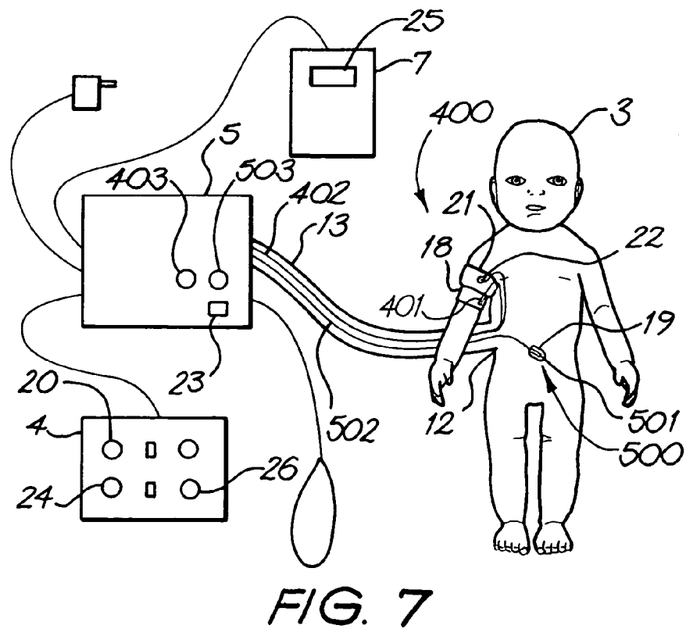
FIG. 7 is a schematic view of the simulator of FIG. 2 depicting the blood vessel simulating systems.

Referring to FIGS. 5 to 7, the patient simulator also includes third and forth fluid flow simulating systems 400, 500 for simulating blood flow for the purpose of measuring pulse rate.

The third fluid simulation system 400 includes an elastically deformable third bladder 401 simulating a brachial blood vessel in the manikin's right arm, The brachial vessel bladder 401 is here in the form of a distensible silicone tube sealed at a distal end thereof. The brachial tube 401 has an internal diameter of 2 to 3 mm. The brachial vessel bladder 401 is mounted on the exterior surface of the upper arm of the manikin 3 adjacent the elbow by way of a thin latex sleeve 18 holding the brachial vessel bladder 401 firmly in place. If the manikin were being manufactured specifically for use with the fluid simulation system, provision could be made for placement of the brachial vessel and bladder 401 directly beneath the surface covering of the manikin itself rather than needing to utilise the latex sleeve 18 when retro fitting the system 400 to the standard manikin 3. A third inlet tube 402 communicates the brachial vessel bladder 401 with a third solenoid valve 403 mounted in the interface box 5 by way of the coupling duct 13. Similarly to the lung simulation systems described above, a third inlet flow restrictor 406 is placed in line with the inlet flow tube 402 and an outlet flow restrictor 405 is placed in line with an outlet flow tube 404 communicating the brachial vessel bladder 401 with the muffler box 14 and vent tube 15 to atmosphere. Here the third inlet flow restrictor 406 has a restricted orifice diameter of 0.010 inches (0.254 mm) whilst the outlet flow restrictor tube 405 has a restricted orifice diameter of 0.020 inches (0.508 mm).

The fourth fluid simulating system 500 simulates the pulse rate in an umbilical blood vessel. The fourth elastically deformable bladder 501 simulates an umbilical blood vessel and is mounted to protrude from the interior of the manikin 3 and into a simulated umbilicus stub 19 of a newborn in the form of a latex tube, conveniently cut from the finger of a surgical glove. The umbilical vessel bladder 501 is again formed from a distensible silicone tube in the same manner as that of the brachial vessel bladder 401. In the same manner as the above described fluid simulating systems, a fourth inlet tube 502 communicates the umbilical vessel bladder 501 with a fourth solenoid valve 503 mounted in the interface box 5. A fourth inlet flow restrictor 506 is mounted in line with the fourth inlet flow tube 502 immediately downstream of the fourth solenoid valve 503, whilst a fourth outlet flow restrictor 505 is mounted in line with an outlet flow tube 504 upstream of the muffler box 14.

An analogue pulse rate input dial 20 on the operate input terminal 5 provides an input pulse rate which is converted into a control signal by the processor 8 to periodically open and close the third and fourth solenoid valves 403, 503 at a cyclic rate corresponding to the pulse rate input by the operator via the pulse rate dial 20. The cyclic opening and closing of the third and fourth solenoid valves 403, 503 provides a cyclic inflation and deflation of the blood vessel simulating bladders 401, 501 which, when felt by manual touch has the realistic feel of a regular pulse rate. The simulator pulse rate of the manikin 3 can accordingly be assessed by a trainee in the usual manner for a newborn, either by grasping the umbilicus stub 19 or with the placement of one or two fingers on the aim at the usual location of the brachial artery.

For a child or adult manikin, a blood vessel simulating bladder could be placed on either side of the neck so as to simulate a carotid artery, being another common blood vessel used for the taking of a pulse.

The present inventors have found that a pulse rate can be most realistically simulated where the control signal provides a constant solenoid valve 403, 503 opening time, with the solenoid valve 403, 503 closing time varying to account for variations in pulse rate. That is, for a slower pulse rate the solenoid valve 403, 503 closing time will be increased whilst maintaining a constant solenoid valve opening time. A particularly suitable solenoid valve opening time is approximately 0.15 seconds. Whilst separate solenoid valves 403, 503 are used to control the flow of fluid to the brachial and umbilical vessel bladders 401, 501, it is envisaged that a single solenoid valve might be utilised to control both circuits if so desired.

The third brachial blood vessel simulating system also provides for simulation of blood pressure. To enable the simulation of blood pressure, the system further comprises a blood pressure sensing apparatus in the form of an inflatable cuff 21 positionable over the limb containing the brachial vessel bladder 401. The inflatable cuff 21 is a standard inflatable blood pressure monitoring cuff, inflatable by a manual pump having a pressure gauge as commonly used for the measurement of blood pressure. The inflatable cuff 21 is provided with a pressure sensor 22 coupled to a comparator 23 mounted in the interface box 5 which compares the cuff pressure with an input blood pressure input by the operator via a blood pressure dial 24 located on the operator input terminal 4.

Whilst the trainer is preparing to take the blood pressure by wrapping the inflatable cuff 21 over the arm above the brachial simulating vessel 401 and subsequently inflating the cuff 21, the processor 8 will generate a signal to close the third solenoid valve 403 once the comparator 23 determines that the cuff pressure exceeds the input blood pressure 24. This will have the effect of cutting off the flow to the brachial vessel simulating bladder 401 in much the same manner as blood flow will be cut off from a real brachial vessel when the inflatable cuff pressure exceeds the systolic blood pressure. To take the systolic blood pressure, the trainee uses a stethoscope in the usual manner to detect the commencement of pulsating flow of blood as the cuff pressure is reduced back down to below the input blood pressure, being the point at which the processor 8 again resumes the cyclic opening and closing of the third solenoid valve 403.

The simulator also comprises an auxiliary pulse oximetry simulating system, as depicted in FIG. 7. This pulse oximetry system is merely a simple system which provides an oxygen saturation reading on a pulse oximeter display 25 which is taken directly from a pulse oximetry input dial 26 on the operator input terminal 4. The input oxygen saturation level is manually adjusted by the operator, and read by the trainee, as a prompt for the trainee to take suitable remedial action which can be assessed. When taking a pulse oximetry reading, the trainee will typically be required to attach a standard pulse oximetry clamp to the manikin's hand in the usual manner to add to the realism of the scenario, however the clamp itself does not in fact effect the system.

It can be seen that the systems described above provide a cost effective, robust and realistic active simulator to aid in medical training, particularly in emergency resuscitation procedures. With the use of a portable cylinder based gas source and power supply, the simulator is also particularly mobile and can be used in out-of-hospital training for emergency workers, paramedics and the armed forces, as well as more common in hospital simulation facilities.

What is claimed is:

1. A system for simulating a fluid flow condition within a fluid carrying body cavity comprising:
    an elastically deformable bladder simulating said body cavity and mounted to the body of a patient simulator manikin,
    a pressurized fluid supply,
    an inlet tube communicating said pressurized fluid supply with said bladder,
    a valve for enabling/disabling flow of fluid through said inlet tube from said pressurized fluid supply to said bladder,
    a controller for controlling said valve based on said simulated fluid flow condition,
    an outlet for venting fluid from said bladder,
    an inlet flow restrictor for restricting flow of said fluid through said inlet tube, and
    an outlet flow restrictor associated with said outlet for restricting flow of said fluid through said outlet.

2. The system of claim 1, wherein said valve comprises a solenoid valve.

3. The system of claim 1, wherein said controller comprises:
    an operator input terminal for inputting said simulated flow condition and a processor for converting said input simulated flow condition into a control signal to open/close said valve.

4. The system of claim 1, wherein said bladder simulates a lung and is mounted within a chest cavity of said manikin.

5. The system of claim 4, wherein said input simulated flow condition is a respiratory rate and said control signal periodically opens and closes said valve at a cyclic rate corresponding to said input respiratory rate.

6. The system of claim 5, wherein said control signal provides a substantially constant ratio of valve opening time to valve closing time irrespective of said respiratory rate.

7. The system of claim 6, wherein said substantially constant ratio is 1:5.

8. The system of claim 4 including two said lung simulating bladders mounted side by side within said chest cavity, each said bladder having a corresponding inlet tube, valve, outlet and outlet flow restrictor associated therewith.

9. The system of claim 8, wherein said system further simulates a pneumothorax condition, said controller further having an pneumothorax input, said controller closing the valve associated with one of said bladders on activation of said pneumothorax input whilst retaining cyclic opening and closing of the valve associated with the other of said bladders.

10. The system of claim 1, wherein said bladder simulates a blood vessel and is mounted adjacent the outer surface of said manikin.

11. The system of claim 10, wherein said blood vessel simulating bladder is in the form of a distensible tube sealed at a distal end thereof.

12. The system of claim 10, wherein said blood vessel simulating bladder simulates a brachial blood vessel.

13. The system of claim 10, wherein said blood vessel simulating bladder simulates an umbilical blood vessel.

14. The system of claim 10, wherein said blood vessel simulating bladder simulates a carotid blood vessel.

15. The system of claim 10, wherein said input flow condition is a pulse rate and said control signal periodically opens and closes said valve at a cyclic rate corresponding to said input pulse rate.

16. The system of claim 15, wherein said control signal provides a constant valve opening time for each cycle irrespective of said pulse rate, said valve closing time varying as said pulse rate.

17. The system of claim 16, wherein said constant valve opening time is 0.15 seconds.

18. The system of claim 15, wherein said blood vessel simulating bladder simulates a brachial blood vessel and said system further simulates blood pressure, said controller further having a blood pressure input, said system further comprising a blood pressure sensing apparatus in the form of an inflatable cuff positional over a limb containing said brachial blood vessel simulating bladder and a pressure sensor for measuring pressure within said cuff, said controller further comprising a comparator for comparing said cuff pressure with said input blood pressure, said controller generating a signal to close said valve when said cuff pressure exceeds said input blood pressure and to open and close said valve at said cyclic rate when said cuff pressure is less than said input blood pressure.

19. The system of claim 1 including at least two said bladders, at least one said bladder simulating a lung and being mounted within a chest cavity of said manikin and at least another said bladder simulating a blood vessel and being mounted adjacent the outer surface of said manikin, each said bladder having a said inlet tube, valve, outlet and outlet flow restrictor associated therewith.

20. A patient simulator comprising:
a manikin body or body portion,
a first elastically deformable bladder simulating a first body cavity and mounted to said body or body portion,
a pressurized fluid supply,
a first inlet tube communicating said pressurized fluid supply with said first bladder,
a first valve for enabling/disabling flow of fluid through said first inlet tube from said pressurized fluid supply to said first bladder,
a controller for controlling said first valve based on a first simulated fluid flow condition,
a first outlet for venting fluid from said first bladder,
a first inlet flow restrictor for restricting flow of said fluid through said first inlet tube, and
a first outlet flow restrictor associated with said first outlet for restricting flow of said fluid through said first outlet.

21. The patient simulator of claim 20 wherein said first bladder simulates a lung and is mounted within a chest cavity of said manikin.

22. The patient simulator of claim 21, said simulator further comprising an auxiliary lung simulating bladder mounted within said chest cavity either overlying or underlying said lung simulating bladder, said auxiliary lung simulating bladder communicating with at least one of a mouth and a nose of said manikin for simulation of externally assisted respiration.

23. The patient simulator of claim 20 wherein said first bladder simulates a blood vessel and is mounted adjacent the outer surface of said manikin.

24. The patient simulator of claim 20 further comprising:
a second elastically deformable bladder simulating a second body cavity and mounted to a said manikin body or body portion,
a second inlet tube communicating said pressurized fluid supply with said second bladder,
a second valve for enabling/disabling flow of fluid through said second inlet tube from said pressurized fluid supply to said second bladder,
a controller for controlling said second valve based on a second simulated fluid flow condition,
a second outlet for venting fluid from said second bladder,
a second inlet flow restrictor for restricting flow of said fluid through said second inlet tube, and
a second outlet flow restrictor associated with said second outlet for restricting flow of said fluid through said second outlet.

25. The patient simulator of claim 24 wherein said first bladder simulates a lung and is mounted within a chest cavity of said manikin and further wherein said second bladder simulates a blood vessel and is mounted adjacent the outer surface of said manikin.

26. A fluid flow apparatus attachable to a simulated patient body and adapted to cyclically move fluids within the simulated patient body, the apparatus comprising:
at least one elastically deformable bladder attachable to the simulated patient body;
a pressurized fluid supply;
at least one inlet tube communicating the pressurized fluid supply to the at least one deformable bladder;
a valve arranged with the at least one inlet tube so as to enable/disable fluid flow between the fluid supply and the bladder;
a controller for controlling enablement/disablement of the valve;
an outlet arranged to vent fluid from the bladder;
an inlet flow restrictor arranged to restrict fluid flow through the at least one inlet tube; and
an outlet flow restrictor arranged with the outlet for restricting fluid flow from the outlet wherein the controller cyclically operates the valve so as to cyclically admit fluid to the bladder such that the bladder cyclically inflates and deflates so as to simulate physiologic cyclic pumping of fluids within the simulated patient body.

27. The apparatus of claim 26, wherein the at least one bladder is mounted within a simulated chest cavity of the simulated patient body so as to simulate a lung.

28. The apparatus of claim 26, wherein the controller maintains a substantially constant ratio of valve enabled to valve disabled times irrespective of the cycling rate.

29. The apparatus of claim 28, wherein the ratio of valve enabled to disabled time is approximately 1:5.

30. The apparatus of claim 26, comprising a plurality of bladders and associated inlet tubes, valves, outlets, inlet flow restrictors, and outlet flow restrictors wherein the controller can selectively disable one or more of the valves of the bladders and associated inlet tubes, valves, outlets, inlet flow restrictors, and outlet flow restrictors while cyclically operating the valves of the remaining bladders and associated inlet tubes, valves, outlets, inlet flow restrictors, and outlet flow restrictors so as to simulate a pneumothorax condition of the simulated patient body.

\* \* \* \* \*

UNITED STATES PATENT AND TRADEMARK OFFICE
CERTIFICATE OF CORRECTION

PATENT NO. : 7,021,940 B2  Page 1 of 1
APPLICATION NO. : 10/303666
DATED : April 4, 2006
INVENTOR(S) : Richard W. Morris et al.

It is certified that error appears in the above-identified patent and that said Letters Patent is hereby corrected as shown below:

Column 2
Line 15, after "controller" insert --,--

Column 3
Line 51, delete "dependent" and insert --dependant--

Column 4
Line 39, after "FIG. 2" insert --.--

Column 6
Line 15, delete "her" and insert --further--

Line 20, delete "We" and insert --the--

Line 29, delete "forth" and insert --fourth--

Line 34, after "arm" delete "," and insert --.--

Column 7
Line 22, delete "aim" and insert --arm--

Column 8
Line 50, after "condition" insert --,--

Column 9
Line 27, delete "rate." and insert -- rate is varied.--

Signed and Sealed this

Twenty-first Day of November, 2006

JON W. DUDAS
*Director of the United States Patent and Trademark Office*